July 11, 1967 R. H. KRESS ETAL 3,330,578
SUSPENSION SYSTEM FOR HEAVY VEHICLES
Filed Sept. 21, 1965 2 Sheets-Sheet 1

INVENTORS
RALPH H. KRESS
BY JACKSON C. MEDLEY

ATTORNEYS

United States Patent Office 3,330,578
Patented July 11, 1967

3,330,578
SUSPENSION SYSTEM FOR HEAVY VEHICLES
Ralph H. Kress, Peoria, and Jackson C. Medley, East Peoria, Ill., assignors to Caterpillar Tractor Co., Peoria, Ill., a corporation of California
Filed Sept. 21, 1965, Ser. No. 488,985
3 Claims. (Cl. 280—423)

ABSTRACT OF THE DISCLOSURE

A suspension system for a heavy duty vehicle wherein a load carrying body is supported on at least one tractor unit by kingpin means or an oil cylinder and in which the tractor means include air springs or struts and means for adding air to the strut which means is responsive to pressure in the oil cylinders as it varies with the weight of the load.

Figure 1:
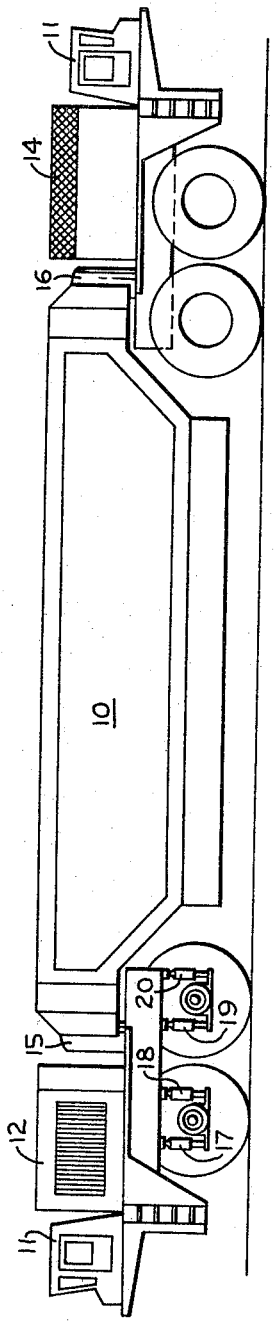

Very large earth and material hauling vehicles are now proving feasible so that a single truck having a load carrying capacity in excess of two hundred tons is presently commercially available. The very tremedous difference between the weight of such a vehicle loaded and empty requires special consideration where suspension is concerned. In one such vehicle, a large body for carrying a load is suspended between two power units having the appearance of trucks or tractors and each having its own engine and operator's station equipped with complete controls for both units, thus the rear unit appears to be operating backwards while the operator controls both from the cab of the front unit. This is an advantage in some mining and earthmoving operations where lack of space prohibits ready manipulation of such a large vehicle. With an operator's cab at both ends, the truck can move back and forth over the same path without the necessity of turning. The two power units have strut type suspension to which gas under pressure may be added to compensate a heavy load. The body is connected to both power units by kingpins or oil cylinders in which the weight of the body and load are transferred to the power units through a confined liquid or lubricant.

It is the object of the present invention to provide simple means for increasing the volume of gas in the suspension struts when the load increases and more specifically to thus increase the volume and extend the several struts of each power unit in response to increased pressure in the single kingpin on said unit caused by increased load. It is also an object of the invention to utilize oil under pressure as a means for forcing gas from a cylinder or container into a strut. Still further and more specific objects and advantages of the invention are made apparent in the following specification wherein reference is made to the accompanying drawings.

Figure 2:
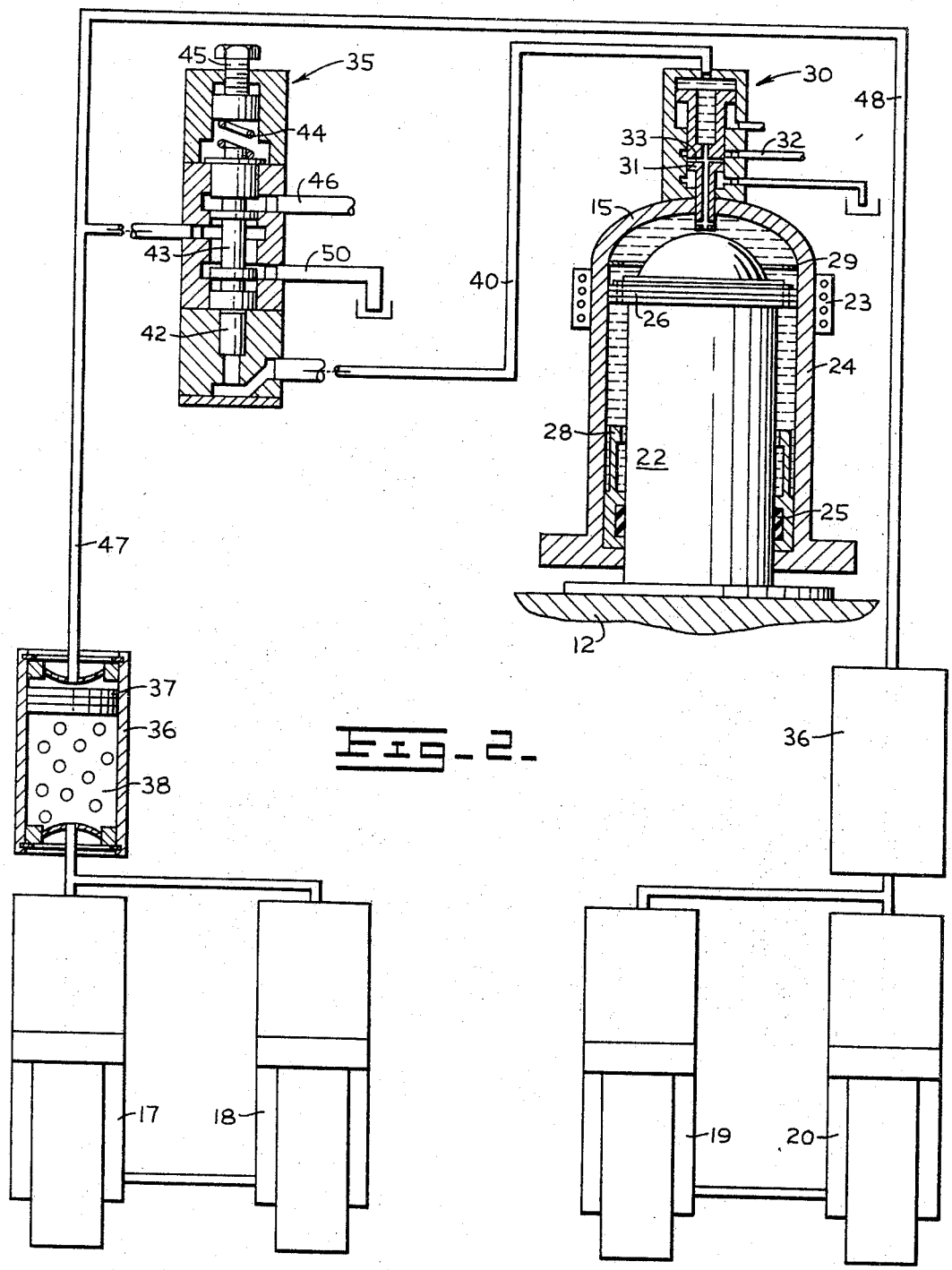

In the drawings:

FIG. 1 is a view in side elevation of a large truck embodying the present invention, parts being broken away to disclose suspension struts; and FIG. 2 is a schematic view of the suspension struts, kingpin and interconnecting hydraulic lines of one of the tractor units which powers the truck illustrated in FIG. 1.

The truck shown in FIG. 1 has a large body 10 for carrying material which may be discharged from bottom dump doors, not illustrated. Two powered tractor units 12 and 14 support the body 10 through kingpins 15 and 16, the construction of which will be more fully explained in connection with FIG. 2. Each tractor has an operator's cab 11 containing controls for operation of the power unit and brakes of both cabs, as well as necessary adjustable components on the body. The tractor 12 is illustrated with the wheels on the near side removed to show struts 17, 18, 19 and 20, which extend between the axles and the tractor frame. The struts 17 and 19 which are on the near side of the tractor are disposed in front of the axles, while struts 18 and 20 on the far side are disposed behind the axles. The same arrangement of struts is present on the tractor 14. These struts are illustrated in FIG. 2 as is the kingpin 15. The kingpin comprises a vertical piston 22 supported on the tractor 12, and a cylinder 24 surrounding the piston and secured to the body 10 through brackets illustrated at 23. The piston and cylinder are concentrically guided by a seal 25 at the lower end and rings 26 adjacent the upper end, there being space between them for the reception of oil which supports the weight of the body and acts as a lubricant. Oil can be added to the interior of the cylinder for the purpose of raising the cylinders and the body supported thereby in order to increase ground clearance when it is desired to do so; however, the means for accomplishing this is not shown as it forms no part of the present invention. Stop means are provided in the form of a ring 28 adjacent the lower end of the cylinder and a ring 29 adjacent its upper end to limit the vertical movement by engagement with the rings 26.

In order to prevent the possibility of supporting the weight of the body by metal-to-metal contact within the kingpin, any leakage of oil therefrom is automatically replaced by a valve generally indicated at 30 on the top of the cylinder. This valve has a spool 31 with an end entering the cylinder and engageable with the top of the piston 22 in the event that the cylinder moves downwardly beyond a predetermined point due to leakage. Such engagement moves the valve spool upwardly with respect to the valve housing, communicating oil from a suitable source through a line 32 and passages 33 to the interior of the cylinder.

When the pressure within the kingpin exceeds a predetermined value because of the load carried by the body 10, a valve, generally indicated at 35, is opened to admit oil under pressure to a cylinder or reservoir 36, thus urging a floating piston 37 therein from one end toward the other end or downwardly as viewed in FIG. 2 to force gas in a chamber 38 beneath the piston into the gas chambers of the struts 17 and 18 and also through a separate line, as shown, into the gas chambers of the struts 19 and 20. The valve 35 controls this supply of oil under pressure which directs additional gas to the struts and is illustrated as having a line 40 communicating with the interior of the kingpin by means of passages in the spool 31 of the valve 30. When the load in the body creates a given pressure in the kingpin, pressure transmitted through the line 40 urges a piston 42 in the valve 35 into engagement with a spool 43 therein, moving the spool against the biasing effect of a spring 44, the tension of which may be adjusted as by an adjusting screw 45. This movement of the spool 43 forms communication between an oil supply line 46 which leads from a source of pressure, not shown, and lines 47 and 48 leading to the two gas supply cylinders 36 which serve to charge the four struts with greater volumes of gas. Upon discharge of a load from the body 10 which effects reduction of pressure in the kingpin, the spring 44 of the valve returns the spool to the position shown, forming communication between line 47 and a vent line 50, thus relieving pressure in the oil chambers of the gas supply cylinders 36 so that gas in the struts will return to the cylinders, urging the piston 37 to the upper ends thereof as shown.

We claim:

1. In a truck having a body and a tractor unit, a kingpin between the body and tractor consisting of telescoping parts containing liquid under compression sustaining weight of the body and load therein, said tractor having a suspension system including struts of the telescoping gas chamber type, pressure actuated valve means operable in response to a predetermined rise in the kingpin liquid pressure to direct additional gas to the struts.

2. The combination of claim 1 with means to vent the additional gas from the struts when the pressure of the kingpin liquid falls below a predetermined level.

3. The combination of claim 1 in which the truck body is supported between two tractor units by two kingpins and in which pressure in each kingpin controls the gas volume in the struts of its respective tractor as recited.

References Cited

UNITED STATES PATENTS

| 2,988,375 | 6/1961 | Lich | 280—124 |
| 3,014,739 | 12/1961 | Kress | 280—489 |
| 3,081,109 | 3/1963 | Davies et al. | 280—438 X |

FOREIGN PATENTS

| 223,014 | 11/1958 | Australia. |
| 239,182 | 6/1960 | Australia. |

LEO FRIAGLIA, *Primary Examiner.*